(12) United States Patent
McLean et al.

(10) Patent No.: US 7,708,512 B2
(45) Date of Patent: May 4, 2010

(54) COMPRESSION LIMITER

(75) Inventors: Shawn G. McLean, Richmond, VA (US); Michael Knipple, Watertown, CT (US); Frank Piacenti, Campbellsville, KY (US)

(73) Assignee: Newfrey LLC, Newark, DE (US)

( * ) Notice: Subject to any disclaimer, the term of this patent is extended or adjusted under 35 U.S.C. 154(b) by 168 days.

(21) Appl. No.: 11/873,870

(22) Filed: Oct. 17, 2007

(65) Prior Publication Data

US 2008/0095593 A1    Apr. 24, 2008

Related U.S. Application Data

(60) Provisional application No. 60/852,593, filed on Oct. 18, 2006.

(51) Int. Cl.
  *F16B 43/00*    (2006.01)
(52) U.S. Cl. ........................................ 411/533; 411/546
(58) Field of Classification Search ................. 411/353, 411/533, 546, 531
  See application file for complete search history.

(56) References Cited

U.S. PATENT DOCUMENTS

| 1,469,880 A | 10/1923 | Bowden |
| 1,572,770 A | 2/1926 | Colley |
| RE18,144 E | 8/1931 | Heiermann |
| 2,091,882 A | 8/1937 | Robinson |
| 2,244,976 A | 6/1941 | Tinnerman |
| 2,374,743 A | 5/1945 | Granville |
| 2,481,325 A | 9/1949 | Miller |
| 2,508,832 A | 5/1950 | McAninch |
| 2,573,498 A | 10/1951 | Scott |
| 2,577,009 A | 12/1951 | Frantz |
| 2,675,844 A | 4/1954 | Knohl |
| 2,709,470 A | 5/1955 | Knohl |
| 2,737,222 A | 3/1956 | Becker |
| 2,798,748 A | 7/1957 | Maurer |
| 2,877,817 A | 3/1959 | Rockwell |
| 2,919,736 A | 1/1960 | Kann |
| 2,919,940 A | 1/1960 | Anderson |
| 2,931,412 A | 4/1960 | Wing |
| 2,991,816 A | 7/1961 | Harbison et al. |
| 3,007,726 A | 11/1961 | Parkin |

(Continued)

FOREIGN PATENT DOCUMENTS

DE    34 19 263    11/1985

(Continued)

*Primary Examiner*—Gary Estremsky
(74) *Attorney, Agent, or Firm*—Michael Leary

(57) ABSTRACT

A compression limiter assembly having a spring washer and a sleeve. The sleeve includes a cylindrical body and a flange radially extending from a first end of the body. A fastener inserted through the spring washer is received in a through aperture of the cylindrical body. The fastener includes a head, an unthreaded shank portion extending from the head, and a threaded shank portion extending from the unthreaded shank portion having a threaded diameter greater than a diameter of the unthreaded shank portion. An annular swage created proximate to the flange defines an internal protuberance extending into the through aperture of the cylindrical body. The protuberance is operable to prevent release of the fastener by contact between the threaded shank portion and the protuberance. The unthreaded shank portion is capable of lateral motion within a diameter defined by the protuberance.

6 Claims, 14 Drawing Sheets

U.S. PATENT DOCUMENTS

| | | | |
|---|---|---|---|
| 3,008,368 A | 11/1961 | Hammitt et al. | |
| 3,032,089 A | 5/1962 | Gutshall | |
| 3,032,370 A | 5/1962 | Moore | |
| 3,083,796 A | 4/1963 | Bell, Jr. | |
| 3,090,203 A | 5/1963 | Burget | |
| 3,093,179 A | 6/1963 | Zahodiakin | |
| 3,141,487 A * | 7/1964 | Boyd | 411/105 |
| 3,180,388 A | 4/1965 | Newcomer, Jr. et al. | |
| 3,221,847 A | 12/1965 | Attwood | |
| 3,232,088 A | 1/1966 | Newcomer, Jr. et al. | |
| 3,262,480 A | 7/1966 | Storch | |
| 3,289,726 A | 12/1966 | Sauter | |
| 3,366,356 A | 1/1968 | Fisher | |
| 3,397,727 A | 8/1968 | Orosz | |
| 3,447,229 A | 6/1969 | Clark | |
| 3,482,865 A | 12/1969 | Haller | |
| 3,583,461 A | 6/1971 | Klaus | |
| 3,584,531 A | 6/1971 | Greenleaf | |
| 3,803,793 A | 4/1974 | Dahl | |
| 3,924,955 A | 12/1975 | Barnett et al. | |
| 3,957,385 A | 5/1976 | Ullberg | |
| 3,964,531 A | 6/1976 | Schenk | |
| 3,978,759 A | 9/1976 | Bakoledis | |
| 4,014,245 A | 3/1977 | Frye et al. | |
| 4,102,030 A | 7/1978 | King, Jr. | |
| 4,125,140 A | 11/1978 | Basile | |
| 4,195,944 A | 4/1980 | Cross | |
| 4,284,379 A | 8/1981 | Chaiko | |
| 4,306,708 A * | 12/1981 | Gassaway et al. | 267/141.3 |
| 4,309,123 A | 1/1982 | Moore | |
| 4,334,599 A | 6/1982 | Ritsema et al. | |
| 4,343,581 A | 8/1982 | Millheiser | |
| 4,396,327 A | 8/1983 | Menke | |
| 4,435,112 A | 3/1984 | Becker | |
| 4,477,228 A | 10/1984 | Duffy et al. | |
| 4,518,282 A | 5/1985 | Wilcox et al. | |
| 4,594,040 A | 6/1986 | Molina | |
| 4,607,992 A | 8/1986 | Mauritz et al. | |
| 4,801,230 A | 1/1989 | Wilburn | |
| 4,818,166 A | 4/1989 | Szukay et al. | |
| 4,828,423 A | 5/1989 | Cramer, Jr. et al. | |
| 4,844,677 A | 7/1989 | Schwartzman | |
| 4,892,000 A * | 1/1990 | Renk et al. | 74/467 |
| 4,906,036 A | 3/1990 | James | |
| 4,911,726 A | 3/1990 | Warkentin | |
| 4,934,888 A | 6/1990 | Corsmeier et al. | |
| 4,971,497 A | 11/1990 | Stoffer et al. | |
| 4,979,858 A | 12/1990 | Van Allman et al. | |
| 4,981,390 A | 1/1991 | Cramer, Jr. et al. | |
| 4,999,019 A | 3/1991 | Kraus | |
| 5,106,250 A | 4/1992 | Fischer et al. | |
| 5,141,357 A | 8/1992 | Sherman et al. | |
| 5,209,620 A | 5/1993 | Zare-Ardestani | |
| 5,232,322 A | 8/1993 | Regensburger | |
| 5,244,325 A * | 9/1993 | Knohl | 411/353 |
| 5,326,206 A | 7/1994 | Moore | |
| 5,328,311 A | 7/1994 | Knohl | |
| 5,364,109 A | 11/1994 | Sihon | |
| 5,395,194 A | 3/1995 | Johnson et al. | |
| 5,415,507 A | 5/1995 | Janusz et al. | |
| 5,427,355 A | 6/1995 | Sukonthapanich | |
| 5,428,895 A | 7/1995 | Sihon | |
| 5,492,343 A | 2/1996 | Smith et al. | |
| 5,509,752 A | 4/1996 | Kocisek | |
| 5,513,603 A | 5/1996 | Ang et al. | |
| 5,531,524 A | 7/1996 | Brouwer | |
| 5,611,628 A | 3/1997 | Brouwer | |
| 5,707,192 A | 1/1998 | Vortriede et al. | |
| 5,807,052 A | 9/1998 | Van Boven et al. | |
| 5,823,752 A | 10/1998 | Hoenisch et al. | |
| RE36,164 E | 3/1999 | Johnson et al. | |
| 6,030,161 A | 2/2000 | Udell et al. | |
| 6,059,503 A * | 5/2000 | Johnson | 411/353 |
| 6,106,207 A | 8/2000 | Kuzdak, III | |
| 6,123,272 A | 9/2000 | Havican et al. | |
| 6,161,840 A | 12/2000 | Boardman et al. | |
| 6,176,665 B1 | 1/2001 | Bondarowicz et al. | |
| 6,192,849 B1 | 2/2001 | Powell | |
| 6,280,132 B1 * | 8/2001 | Szczukowski et al. | 411/353 |
| 6,286,471 B1 | 9/2001 | Powell | |
| 6,394,055 B2 | 5/2002 | Powell | |
| 6,435,427 B1 | 8/2002 | Conroy | |
| 6,457,925 B1 * | 10/2002 | Genick, II | 411/353 |
| 6,478,519 B1 | 11/2002 | Genick, II | |
| 6,663,330 B2 | 12/2003 | Powell | |
| 6,804,872 B2 | 10/2004 | Powell | |
| 6,872,040 B2 * | 3/2005 | Deeg et al. | 411/353 |
| 6,994,354 B2 | 2/2006 | Sakata | |
| 7,070,377 B2 | 7/2006 | Fonville | |
| 2004/0022600 A1 | 2/2004 | Kovac | |
| 2004/0109742 A1 | 6/2004 | Kovac | |
| 2004/0213645 A1* | 10/2004 | Kovac | 411/512 |
| 2005/0025566 A1* | 2/2005 | Hasegawa | 403/408.1 |

FOREIGN PATENT DOCUMENTS

| | | |
|---|---|---|
| DE | 37 06 616 | 9/1988 |
| DE | 40 07 941 | 9/1990 |
| GB | 855297 | 11/1960 |

\* cited by examiner

COMPRESSION LIMITER

This application claims the benefit of U.S. Provisional Application No. 60/852,593, filed on Oct. 18, 2006. The disclosure of the above application is incorporated herein by reference.

FIELD

The present disclosure relates to devices and methods for use of pre-assembled fastener assemblies used to fasten a first workpiece to a second workpiece where the workpieces include different materials, the device permitting compensation for misalignment and construction tolerances between the first and second workpieces.

BACKGROUND

The statements in this section merely provide background information related to the present disclosure and may not constitute prior art.

Fastening members are widely used to join materials of different properties to one another including applications such as fastening plastic or polymeric parts such as covers and trim pieces to metal components or parts of an automobile vehicle assembly. One such device is disclosed in U.S. Pat. No. 5,807,052 to Van Boven et al. The '052 patent defines an assembly for bearing the load from a metallic fastener coupled through a plastic part to a vehicle metallic part. Several disadvantages exist for the '052 patent. These include the incorporation of a springing flange into the design of a sleeve which requires additional machining to achieve the springing function with the required clearance to permit the flange to deflect during assembly of the fastener. A further disadvantage is the fastener itself must be specially machined or formed having a protruding shank rib member to prevent the fastener from releasing from the sleeve assembly prior to installation. The rib member precludes the use of standard fastener designs for this application and therefore increases the cost of construction.

Further disadvantages of the '052 patent include a machining or forming process required on the internal bore of the sleeve to create a stop which engages the shank rib member. This machining or forming process removes material from the sleeve and is accomplished inside the sleeve bore and therefore generally increases the cost of the sleeve. A lower or second flange created on the sleeve further increases the cost of the sleeve by requiring an additional operation to create the flange or a machining operation to remove material to create the flange.

Plastic or polymeric components such as valve covers used in conjunction with an automobile vehicle engine block reduce the cost and weight of the cover, however the thermal cycling over time and/or the stress/strain over time of the cover can generate creep in the plastic material used for the cover and a subsequently loose connection between the cover and the engine block. A reduced complexity fastener assembly is therefore warranted for this application as well as additional applications where dissimilar materials are fastened.

SUMMARY

According to several embodiments a compression limiter of the present disclosure includes a body having a flange radially outwardly extending from a first end of the body. A fastener received in a through aperture of the body, the fastener includes a head; an unthreaded shank portion axially extending from the head; and a threaded shank portion extending from the unthreaded shank portion having a threaded diameter greater than a diameter of the unthreaded shank portion. A protuberance created proximate to the flange defines an internal member extending partially into the through aperture of the body, the protuberance operable to prevent free axial release of the fastener by contact between the threaded shank portion and the protuberance, the unthreaded shank portion being capable of a lateral motion within a diameter defined by the protuberance.

According to other embodiments, a compression limiter assembly has a spring washer and a sleeve. The sleeve includes a cylindrical body and a flange radially extending from a first end of the body. A fastener inserted through the spring washer is received in a through aperture of the cylindrical body. The fastener includes a head, an unthreaded shank portion extending from the head, and a threaded shank portion extending from the unthreaded shank portion having a threaded diameter greater than a diameter of the unthreaded shank portion. An annular swage created proximate to the flange defines an internal protuberance extending into the through aperture of the cylindrical body. The protuberance is operable to prevent release of the fastener by contact between the threaded shank portion and the protuberance. The unthreaded shank portion is capable of lateral motion within a diameter defined by the protuberance.

According to still other embodiments, a compression limiter assembly includes a washer. A body includes a flange radially and homogenously extending from a first end of the body; and an internal protuberance created proximate to the flange and extending partially into a through aperture of the body. A fastener is inserted through the washer and received in the through aperture of the body prior to creation of the internal protuberance. The fastener includes a head in contact with the washer, an unthreaded shank portion extending immediately from the head, and a threaded shank portion extending from the unthreaded shank portion having a threaded diameter greater than a diameter of the unthreaded shank portion. A diameter defined by the internal protuberance prevents sliding release of the fastener by contact between the threaded shank portion and the internal protuberance. The diameter is greater than the threaded diameter of the unthreaded shank portion to permit lateral motion of the fastener unthreaded shank portion within the diameter.

According to further embodiments, an annular ring is created on the cylindrical body which frictionally engages with a wall created within an aperture of a polymeric body or sleeve. In additional embodiments, a knurled area replaces the annular ring. In still further embodiments, individual raised protuberances replace the annular ring.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
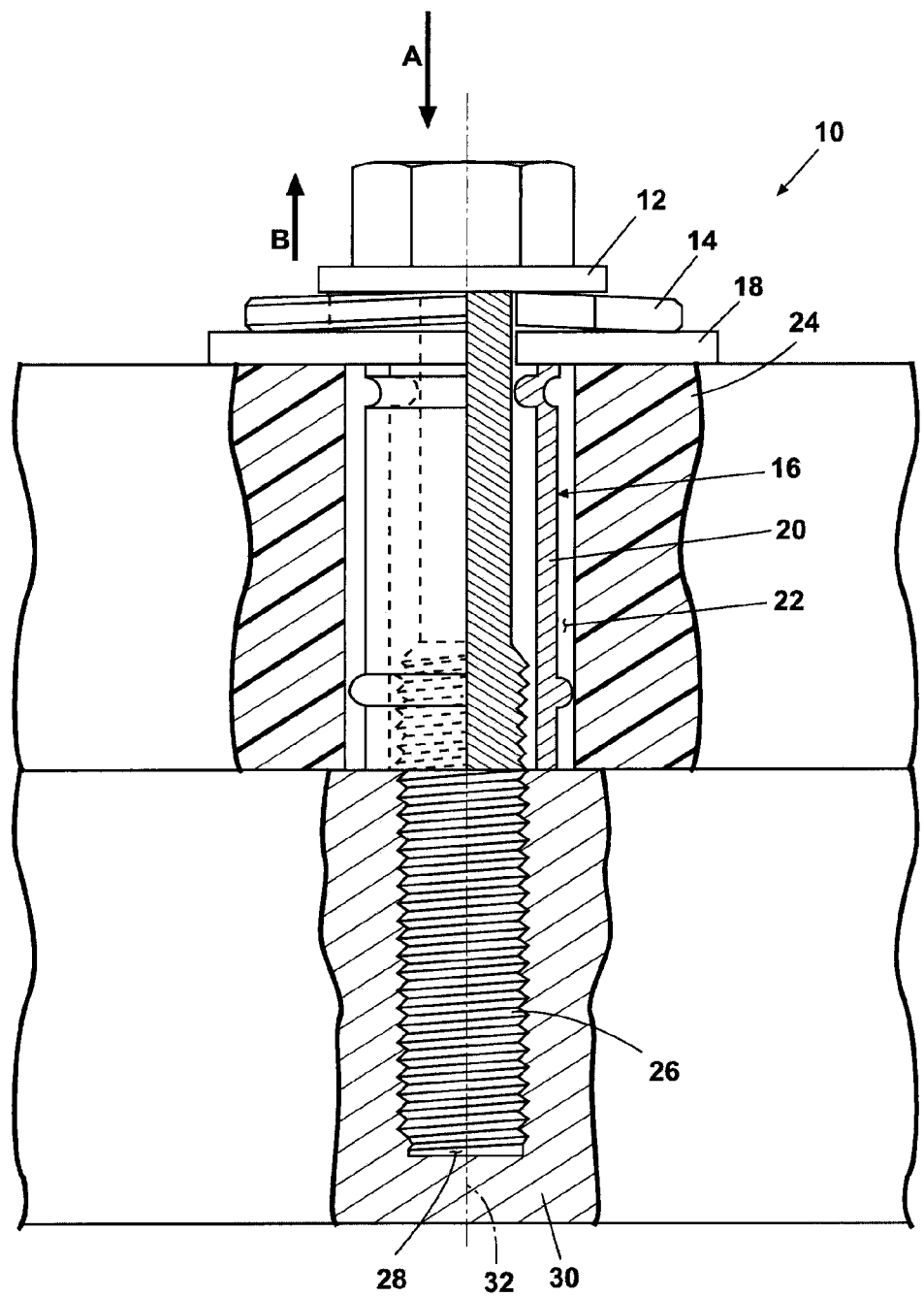
FIG. 1 is a partial cross-sectional elevational view of a compression limiter of the present disclosure in an assembly joining a polymeric first part to a metallic second part.

The following description is merely exemplary in nature and is not intended to limit the present disclosure, application, or uses. It should be understood that throughout the drawings, corresponding reference numerals indicate like or corresponding parts and features.

According to several embodiments of the present disclosure and referring generally to FIG. 1, a compression limiter assembly 10 includes a fastener 12 such as a bolt or stud-bolt, a spring washer 14, a sleeve 16 having a flange 18, and a homogenously connected substantially cylindrical sleeve body 20 extending transversely from the flange 18. The flange 18 extends radially outward from a first end of the sleeve body 20.

Compression limiter assembly 10 can be used by positioning sleeve body 20 in a smooth bore aperture 22 of a polymeric body 24. As non-limiting examples only polymeric body 24 can be a flange or mounting body portion of an automobile vehicle valve or head cover, a junction box, a mounting bracket, an instrument panel, or more generally a container or trunk cover which is fastenably connected using a threaded shank portion 26 of fastener 12 threadably connected in a threaded aperture 28 created in a substantially incompressible receiving body 30. According to several embodiments, receiving body 30 can be a vehicle engine block, a receiving portion of a junction box, a plate to which a mounting bracket is connected, a body panel of a vehicle for example having an instrument panel mounted thereto, or a box or trunk receiving a cover. The above are intended as examples and to not limit the applications of the present disclosure.

Compression limiter assembly 10 allows a polymeric or in several additional embodiments a compressible material to be fastened to receiving body 30. Receiving body 30 is generally a substantially incompressible material such as a metal, including steel, stainless steel or the like. "Incompressible" materials as used herein are generally materials that do not exhibit creep when loaded such as by a fastener 12 of the present disclosure. In at least several embodiments of the present disclosure, compression limiter assembly 10 is used to mount a polymeric material head cover to a metal automobile vehicle engine block. Polymeric materials can be used for valve or engine covers to reduce weight and costs. The softer or somewhat compressible materials used are subject to creep and therefore could yield or creep when a metallic fastener 12 is used to mount the cover to the engine block. Sleeve 16 is therefore positioned to direct a majority of the axial force or load created by applying a torque to fastener 12 directly to the receiving body 30 (e.g.: engine block) provided of a similarly substantially incompressible material such as a metal. A portion of the fastener load is also directed into the polymeric body 24 using spring washer 14 to draw polymeric body 24 into contact with the receiving body 30.

Compression limiter assembly 10 can be used by inserting fastener 12 in an installation direction "A" through spring washer 14, flange 18, and sleeve body 20, until threaded shank portion 26 is aligned with and threadably received in threaded aperture 28 of receiving body 30. When a torque is applied to fastener 12, spring washer 14 is compressed in the installation direction "A". Spring washer 14 provides a resistance to release of fastener 12 in a release direction "B" by its ability to compress upon installation of fastener 12. When assembled, compression limiter assembly 10, polymeric body 24, and receiving body 30 are co-aligned along an assembly longitudinal axis 32.

Figure 2:
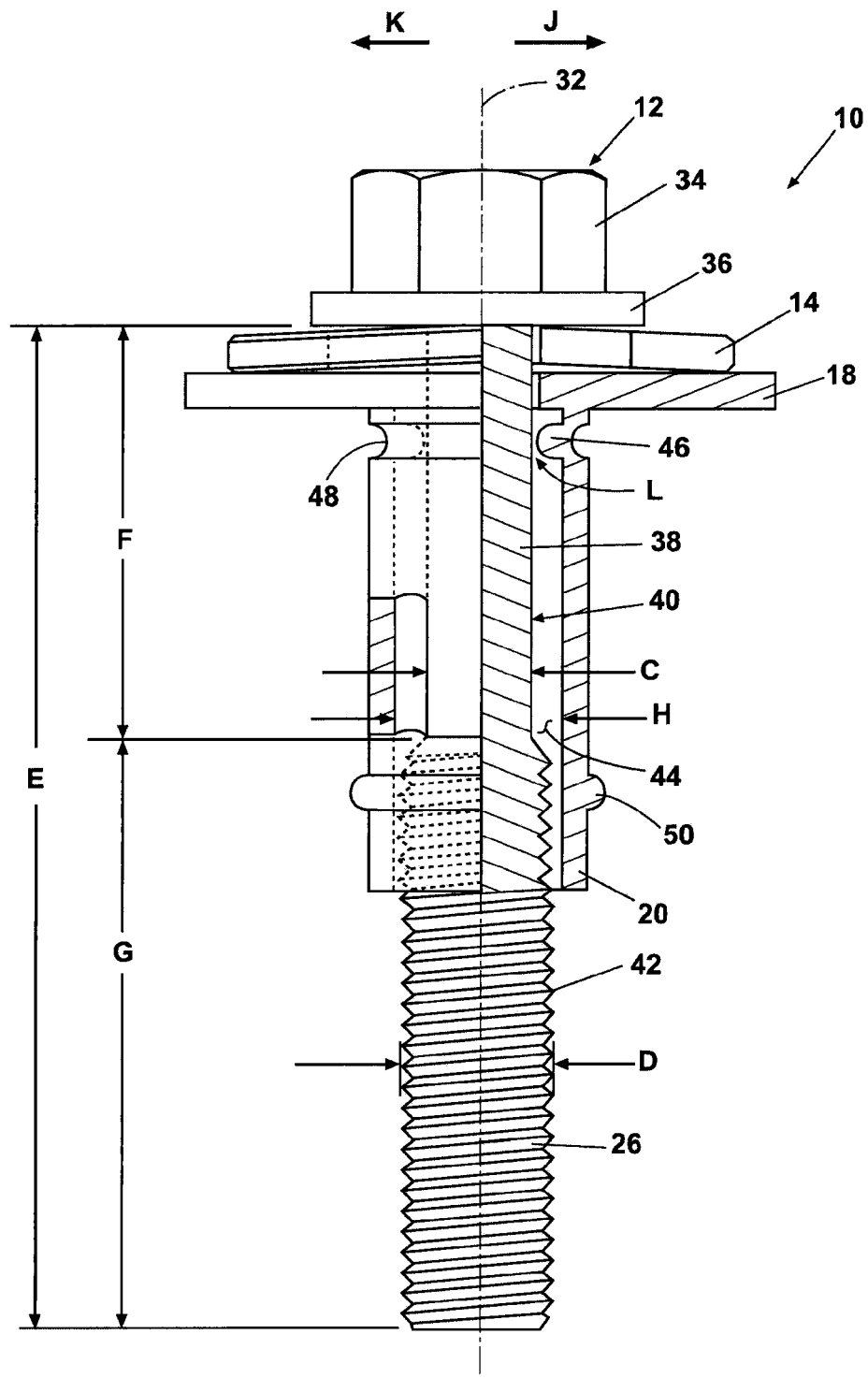
FIG. 2 is a partial cross-sectional elevational view of the compression limiter of FIG. 1.

Referring now to FIG. 2, fastener 12 can include a head 34 which according to several embodiments has a polygonal shape such as a hexagon homogenously connected to a fastener flange 36. An unthreaded shank portion 38 extends from fastener flange 36 having a smooth outer wall 40. Threaded shank portion 26 includes a male thread 42. Unthreaded shank portion 38 and threaded shank portion 26 are both slidably received within a sleeve internal cylinder 44 created within sleeve body 20. Unthreaded shank portion 38 has an unthreaded diameter "C" which is smaller than a thread diameter "D" of threaded shank portion 26. Fastener 12 is prevented from releasing in the release direction "B" by an internal protuberance 46 which is created by forming an indentation or annular swage 48 on an outer surface of sleeve body 20 proximate to flange 18 which locally forces material of sleeve body 20 to protrude into the sleeve internal cylinder 44.

Threaded shank portion 26 and unthreaded shank portion 38 together define a shank length "E". Unthreaded shank portion 38 includes an unthreaded length "F", and threaded shank portion 26 includes a threaded length "G". Sleeve internal cylinder 44 defines an inner diameter "H". Inner diameter "H" is greater than both unthreaded diameter "C" and threaded diameter "D" of fastener 12. Fastener 12 is permitted to move by sliding axially along axis 32 within sleeve internal cylinder 44 of sleeve body 20 until threaded shank portion 26 contacts internal protuberance 46. Fastener 12 is also permitted to move laterally with respect to assembly longitudinal axis 32 in at least each of a first radial direction "J" and a second radial direction "K". Lateral motion is permitted because a clearance "L" is retained between sleeve outer wall 40 and internal protuberance 46. Clearance "L" defines a diameter between inner opposed surfaces of internal protuberance 46 which is greater than unthreaded diameter "C" but less than thread diameter "D". In addition, according to several embodiments, an annular ring 50 defining an external protuberance can be created on an outer surface of sleeve body 20. The purpose for annular ring 50 will be further described in reference to FIG. 3.

Figure 3:
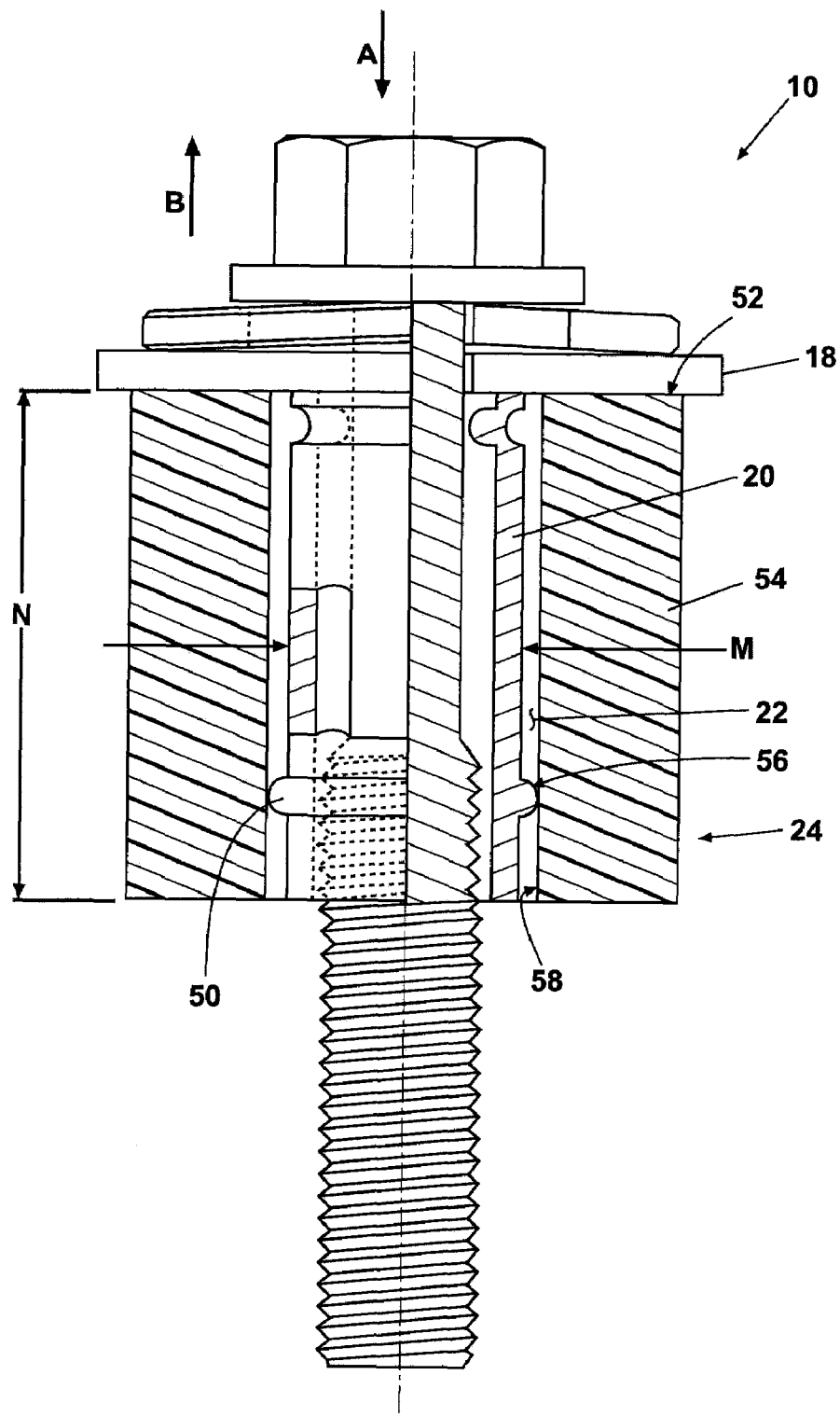
FIG. 3 is a partial cross-sectional elevational view of the compression limiter of FIG. 2 positioned within a polymeric sleeve.

Referring now generally to FIG. 3, polymeric body 24 can itself include smooth bore aperture 22 or in additional embodiments polymeric body 24 can further include a polymeric sleeve 54 having smooth bore aperture 22 created therein. It is desirable to engage sleeve body 20 within smooth bore aperture 22 to prevent sliding motion between sleeve body 20 and polymeric body 24. To accomplish this, a friction or interference fit is created between a ring surface 56 of annular ring 50 and a wall 58 defined by smooth bore aperture 22. Sleeve body 20 is assembled into polymeric body 24 (or polymeric sleeve 54) by pressing flange 18 to force sleeve body 20 into smooth bore aperture 22 in installation direction "A". This frictional or interference fit of annular ring 50 provides retention capability to allow compression limiter assembly 10 to be preassembled into polymeric body 24 prior to shipment of polymeric body 24. Annular ring 50 therefore extends radially outward from a sleeve outer diameter "M" of sleeve body 20. Sleeve body 20 has a body length "N" which is substantially equal to or slightly less than a similar length or depth of polymeric body 24. By maintaining the body length "N" equal to or slightly less than the length or depth of polymeric body 24, the mechanical load applied by fastener 12 through flange 18 to polymeric body 24 does not significantly compress polymeric body 24 which can permit subsequent creep in the material of polymeric body 24. The load provided by fastener 12 is therefore substantially borne through sleeve body 20 in direct contact with receiving body 30 (shown in FIG. 1).

Figure 4:
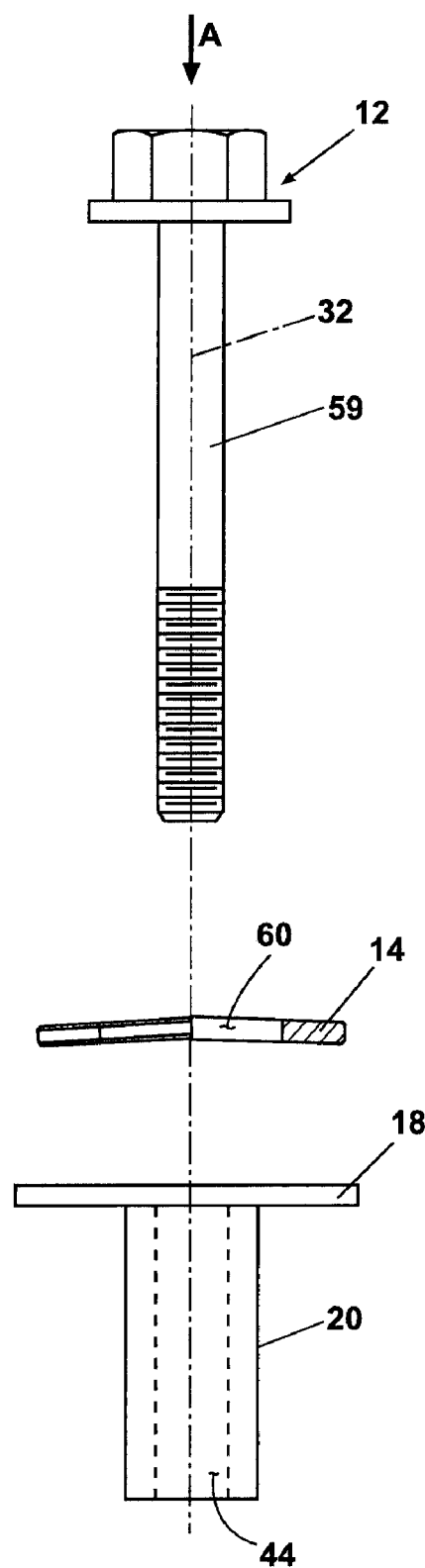
FIG. 4 is a side elevational exploded view of a sub-assembly of the compression limiter of FIG. 1.

Referring now generally to FIG. 4, compression limiter assembly 10 can be sub-assembled as follows. A shank 59 of fastener 12 is inserted in the installation direction "A" along assembly longitudinal axis 32 through a receiving aperture 60 of spring washer 14. Shank 59 is further inserted through flange 18 to be received by sleeve internal cylinder 44 of sleeve body 20.

Figure 5:
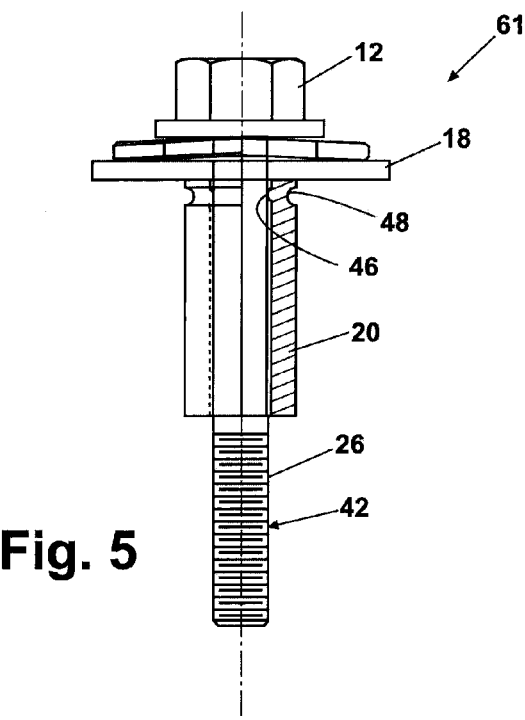
FIG. 5 is a partial cross-sectional elevational view of the completed sub-assembly of FIG. 4.

Referring now to FIG. 5, once the installation described in reference to FIG. 4 is complete, a sub-assembly 61 is created by forming annular swage 48 proximate to flange 18. Annular swage 48 is formed after threaded shank portion 12 is extended as shown to insure that internal protuberance 46 does not interfere with the male thread 42 of threaded shank portion 26. Fastener 12 is thereafter permitted to axially slide within sleeve body 20 as previously discussed but is prevented from being withdrawn from sleeve body 20 by internal protuberance 46 contacting male threads 42.

Figure 6:
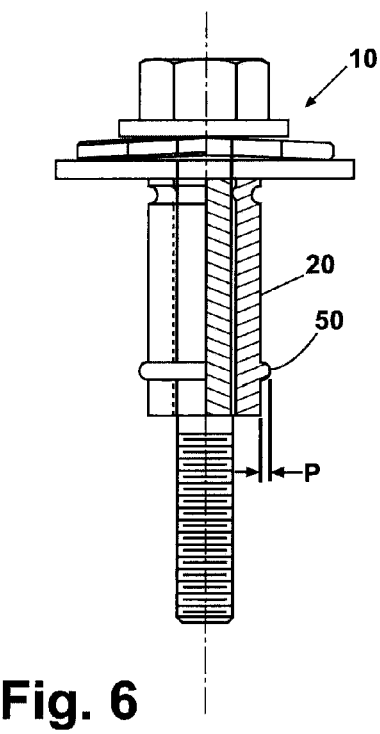
FIG. 6 is a partial cross-sectional elevational view of the compression limiter similar to FIG. 2.

Referring now to FIG. 6, compression limiter assembly 10 is completed from sub-assembly 61 shown in reference to FIG. 5 by a further operation to create annular ring 50 about sleeve body 20. Annular ring 50 can be created for example by a rolling operation or using a die. Annular ring 50 defines a ring height "P" from the outer surface of sleeve body 20. Ring height "P" is predetermined to provide the necessary frictional or interference fit within smooth bore aperture 22 of polymeric body 24.

Figure 7:
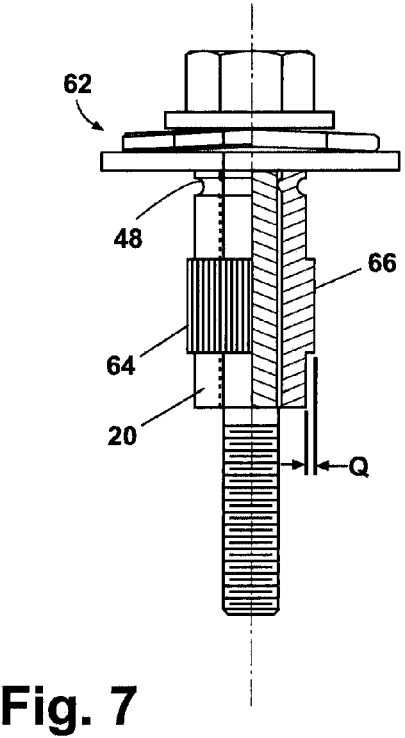
FIG. 7 is a partial cross-sectional elevational view of another embodiment of the compression limiter of the present disclosure.

Referring now to FIG. 7, according to additional embodiments of the present disclosure a compression limiter assembly 62 is modified from compression limiter assembly 10 by substituting a knurled area 64 for the annular ring 50 of compression limiter assembly 10. Knurled area 64 can be created after formation of annular swage 48. Knurled area 64 defines a raised surface 66 having a raised surface height "Q". Raised surface height "Q" according to several embodiments is substantially equal to ring height "P". One benefit of using knurled area 64 in place of annular ring 50 is knurled area 64 defines a surface which longitudinally engages wall 58 and is therefore more resistant to rotation or twisting of sleeve body 20 within polymeric body 24.

Figure 8:
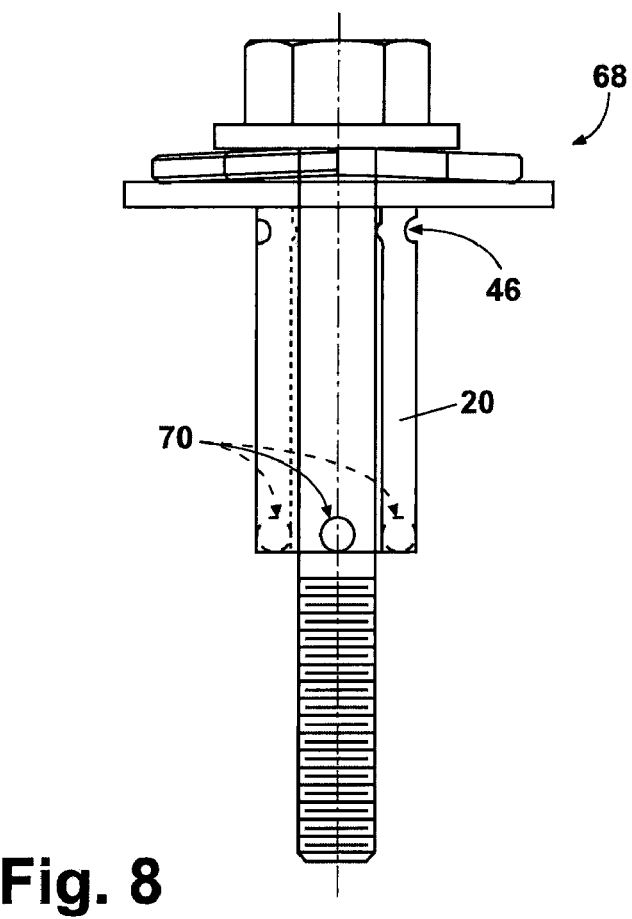
FIG. 8 is a side elevational view of a further embodiment of a compression limiter of the present disclosure.
Figure 9:
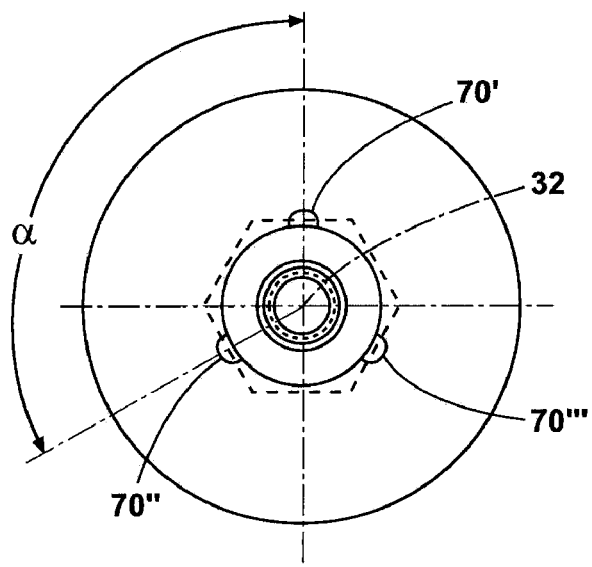
FIG. 9 is a bottom plan view of the compression limiter of FIG. 8.

Referring generally now to FIGS. 8 and 9, according to additional embodiments, a compression limiter assembly 68 includes at least two and in several embodiments a plurality of external protuberances 70 created about the outer surface of sleeve body 20 in place of annular ring 50. As best seen in FIG. 9, according to several embodiments, three external protuberances 70', 70" and 70''' are equally spaced about sleeve body 20 defining an angle α with respect to assembly longitudinal axis 32. Angle α is shown for example between external protuberance 70' and 70". As will be evident to a person of skill in the art angle α can vary depending upon the quantity of external protuberances 70 used. In the example shown in FIG. 9, angle α is approximately 120°.

Figure 10:
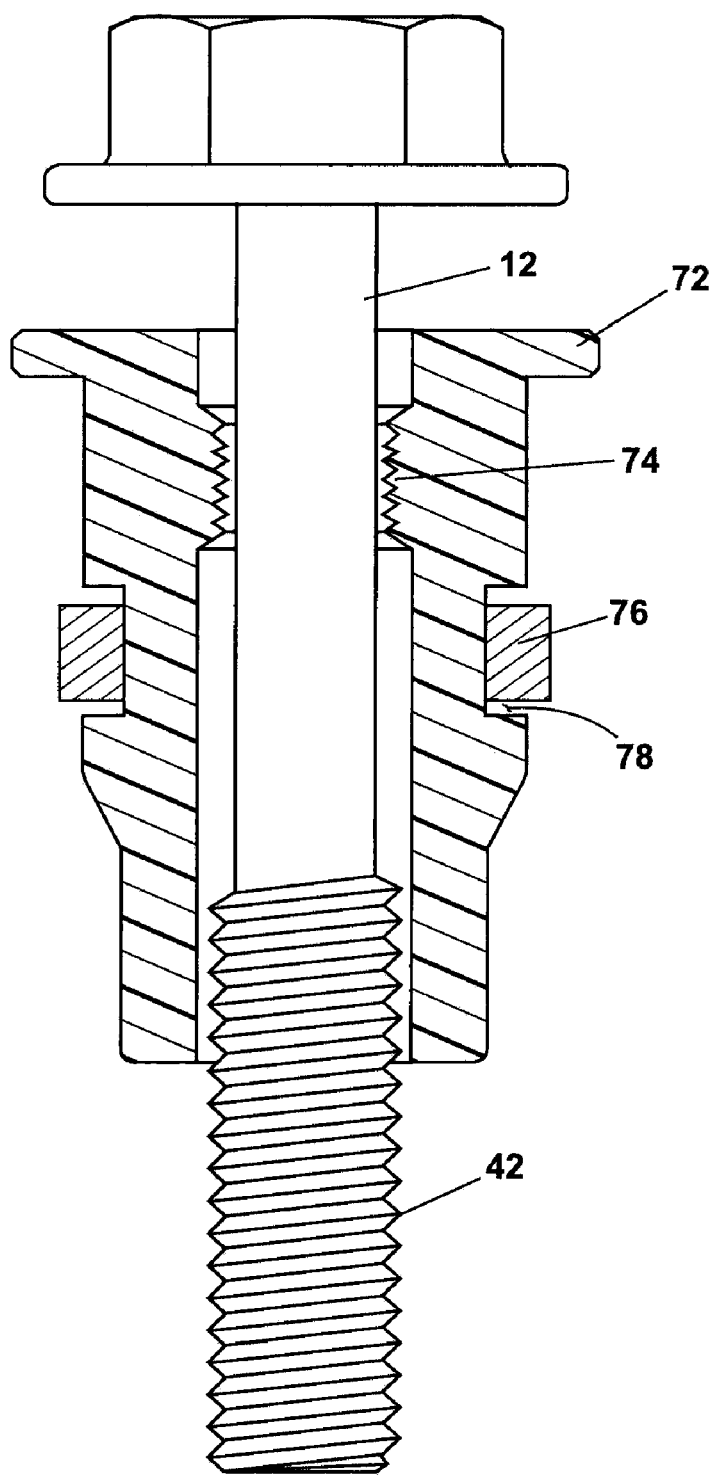
FIG. 10 is a partial cross-sectional elevational view of another embodiment of a compression limiter of the present disclosure.
Figure 11:
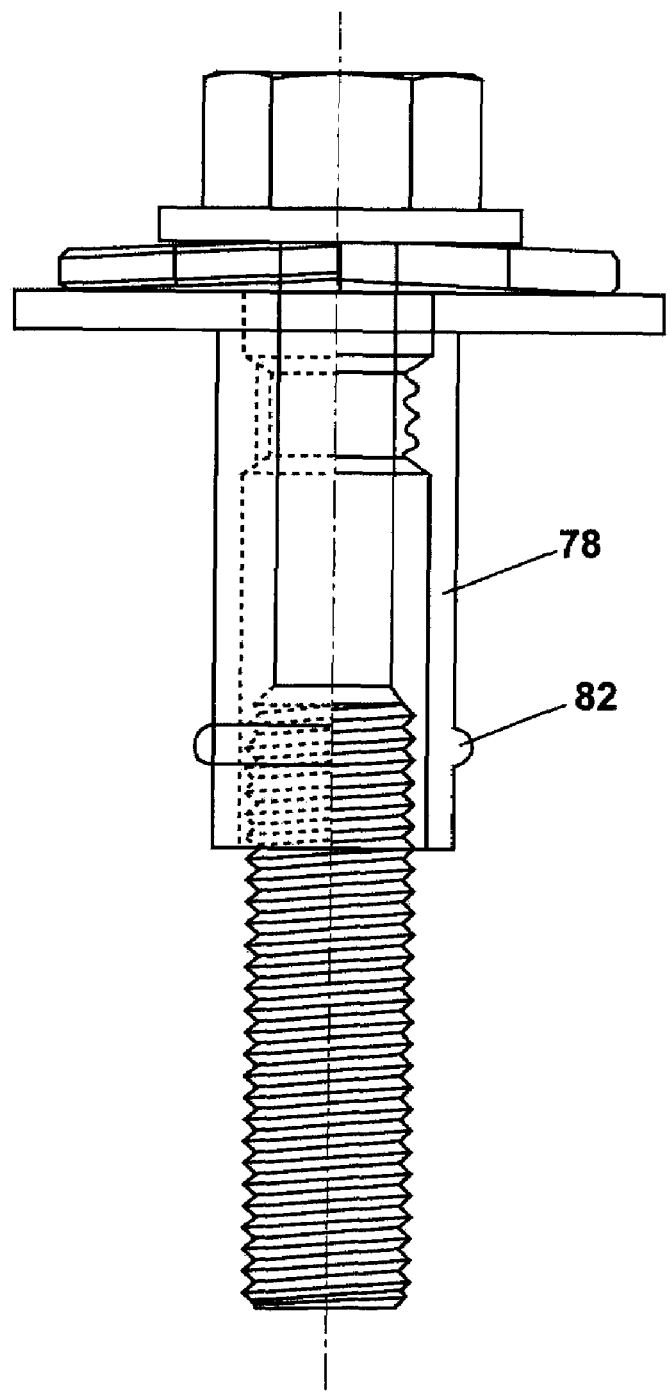
FIG. 11 is a partial cross-sectional elevational view of another embodiment modified from the compression limiter of FIG. 10.
Figure 12:
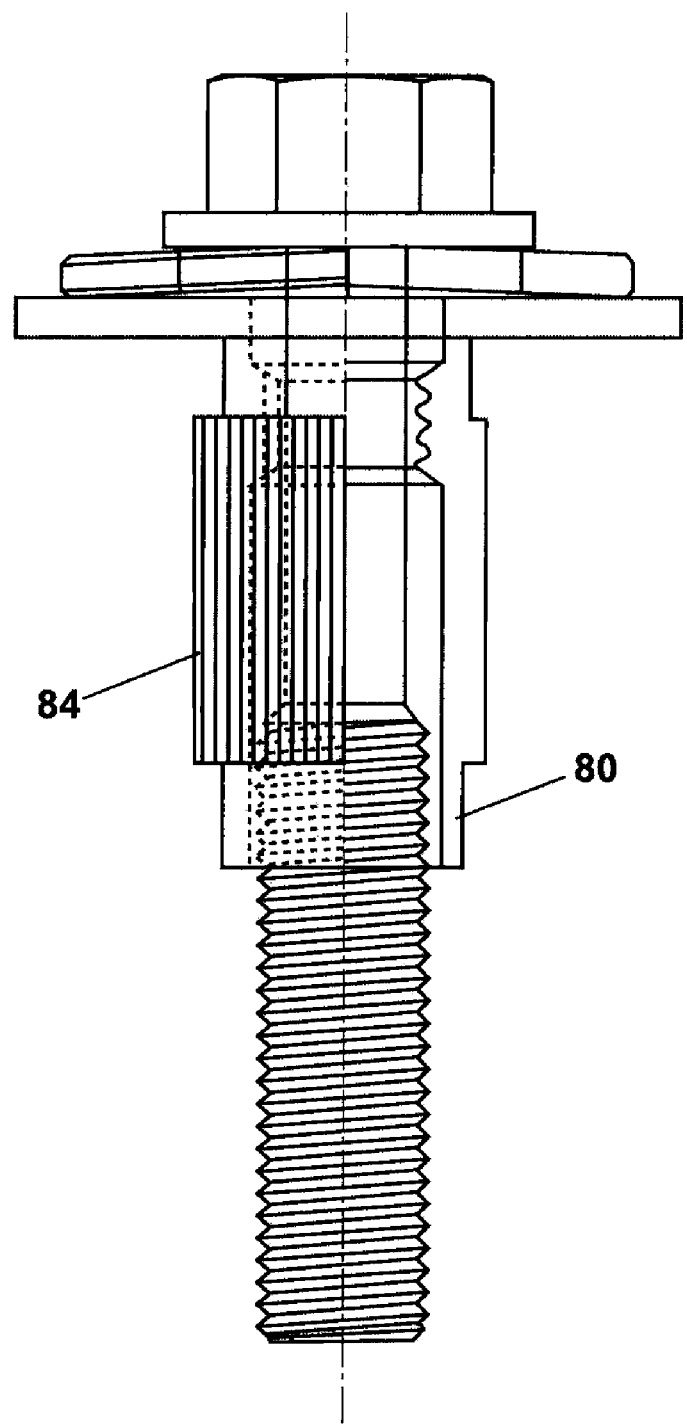
FIG. 12 is a partial cross-sectional elevational view of another embodiment modified from the compression limiter of FIG. 10.

Referring now to FIGS. 10 through 12, additional embodiments of compression limiters of the present disclosure include internally threaded portions adapted to receive the male threads 42 of fastener 12. FIG. 10 provides a tapered sleeve 72 having an internally female threaded portion 74 adapted to receive the male thread 42 of fastener 12 and retain the position of fastener 12 during both shipment and prior to installation of fastener 12. A compressible washer 76 such as an O-ring or similar washer can be used to retain tapered sleeve 72 in the aperture 22 of polymeric body 24. FIGS. 11 and 12 provide a sleeve 78 and a sleeve 80 modified from sleeve 72 to provide an annular ring 82 similar to annular ring 50 and knurled area 84 similar to knurled area 64 respectively.

Referring to 13, according to a further embodiment of the present disclosure, a compression limiter assembly 86 is adapted to accept fastener 12 and spring washer 14. Compression limiter assembly 86 includes a sleeve member 88 having a tubular shaped sleeve body 90 and a flange 92 transversely and radially extending outwardly from sleeve body 90. At least one and in several embodiments three swages 94 are created in sleeve body 90 after fastener 12 is inserted through sleeve body 90. Swages 94 are created for example by coining or yielding the material of an outer tubular body wall 96 of sleeve body 90 so that material of sleeve body 90 contacts or is closely spaced from the unthreaded shank portion 38 of fastener 12 such that the larger diameter threaded shank portion 26 is restrained from withdrawal in a direction represented by arrow 95.

A retainer ring 98 is adapted to be slidably disposed and frictionally engage body wall 96 of sleeve body 90 and is received on sleeve body 90 in the direction of arrow 95. A material of sleeve member 88 can be a metal such as SAE 1006 steel, other steel alloys, aluminum, or the like. Retainer ring 98 can be a polymeric material such as but not limited to a polyester material. A material for flex washer 14 can be a metal such as but not limited to MS35138 heat treated per HRC 36-46.

Figure 14:
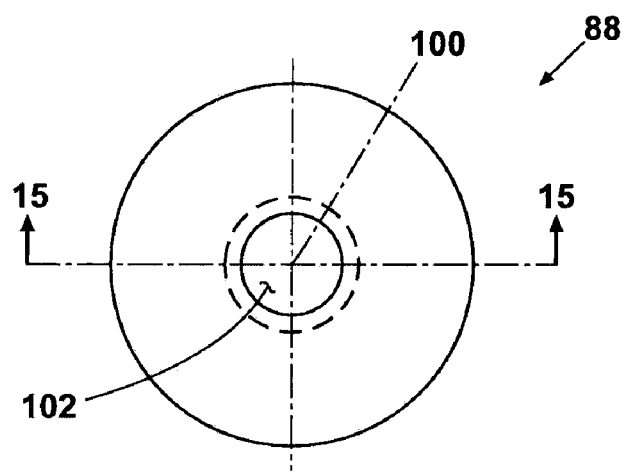
FIG. 14 is a top plan view of a sleeve member of the present disclosure.
Figure 15:
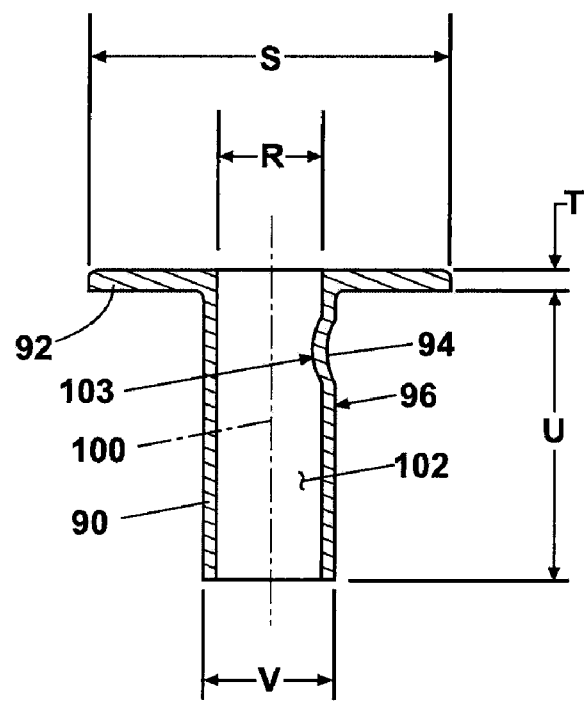
FIG. 15 is a cross sectional front elevational view of the sleeve member of FIG. 14.

Referring now generally to FIGS. 14 and 15, sleeve member 88 further defines a longitudinal axis 100 and includes a through-aperture 102 co-axially aligned with longitudinal axis 100 created through both sleeve body 90 and flange 92. Each of the swages 94 (only one is shown in FIG. 15) are created as shown by plastically yielding the material from body wall 96 inwardly into through-aperture 102 creating a depressed inner wall 103 which locally reduces a diameter "R" of through aperture 102. Flange 92 has a diameter "S" and a thickness "T". Sleeve body 90 has a length "U" and an outer diameter "V". According to several embodiments, diameter "R" is approximately 0.24 in (6.1 mm), diameter "S" is approximately 0.83 in (21.01 mm), thickness "T" is approximately 0.07 in (1.93 mm), length "U" is approximately 0.07 in (17.45 mm), and outer diameter "V" is approximately 0.35 in (8.99 mm). These dimensions are provided for exemplary purposes, and can vary at the discretion of the manufacturer.

Figure 13:
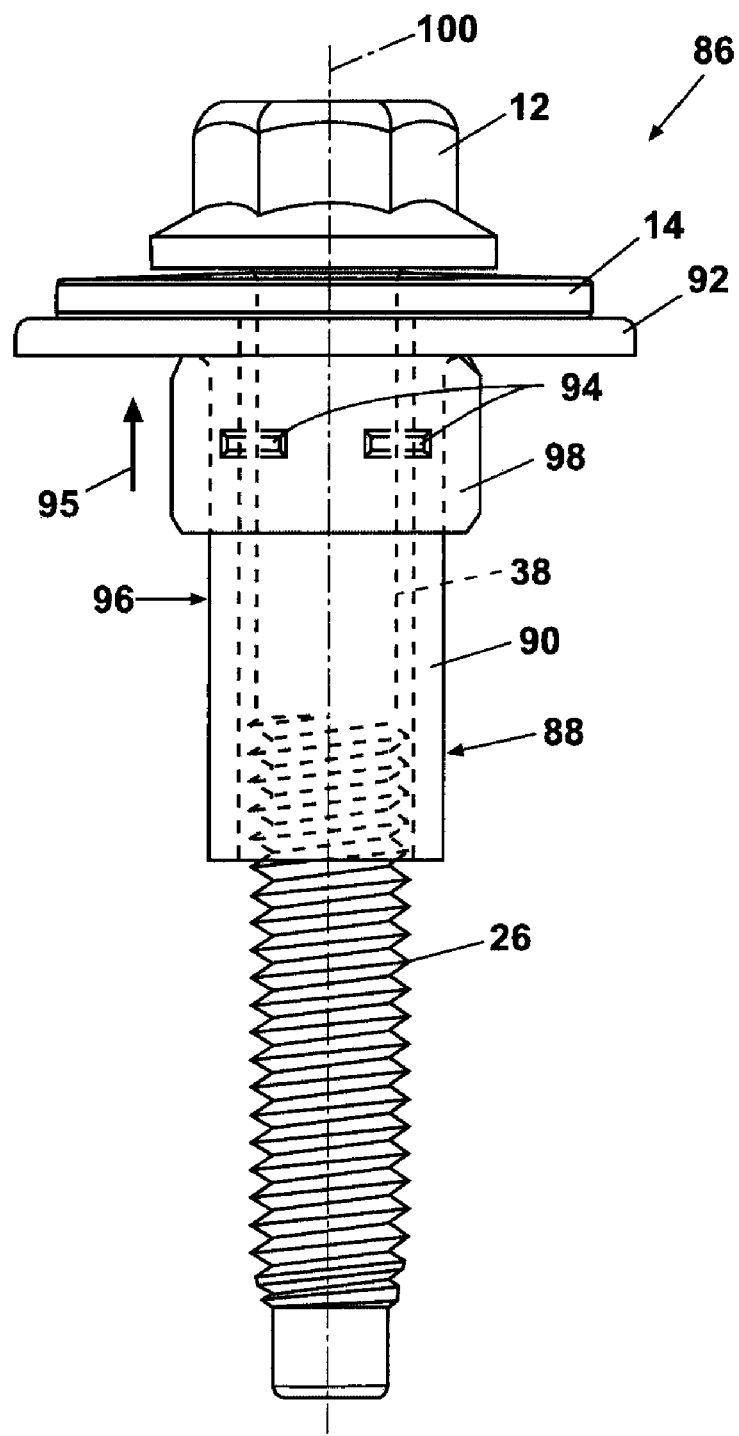
FIG. 13 is a side elevational view of another embodiment of a compression limiter of the present disclosure.
Figure 16:
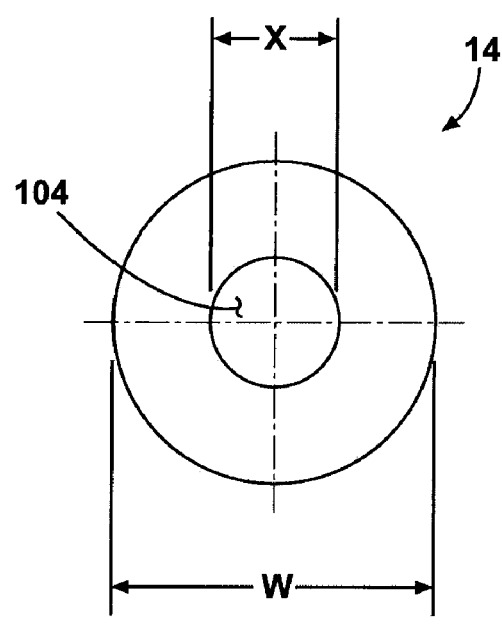
FIG. 16 is a top plan view of a flex washer of the present disclosure.
Figure 17:
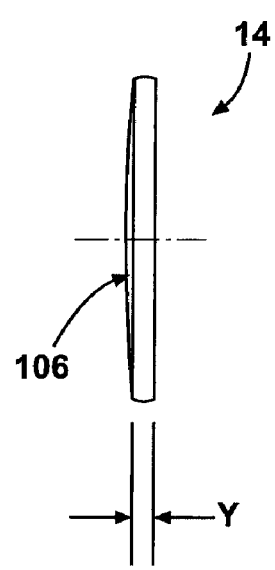
FIG. 17 is a side elevational view of the flex washer of FIG. 16.

Referring to FIGS. 16 and 17, flex washer 14 can have an outer diameter "W" and a through-aperture 104 defining a through-aperture diameter "X". A thickness "Y" is defined for the main body portion of flex washer 14 and a raised portion 106 is also created. According to several embodiments, outer diameter "W" is approximately 0.71 in to 0.79 in (18 to 20 mm), diameter "X" is approximately 0.21 in (5.44 mm), and thickness "Y" is approximately 0.0.029 to 0.035 to (0.74 to 0.89 mm). Diameter "X" is adapted to provide a clearance fit for the threaded shank portion 26 (shown in FIG. 13) of fastener 12.

Figures 18, 19:
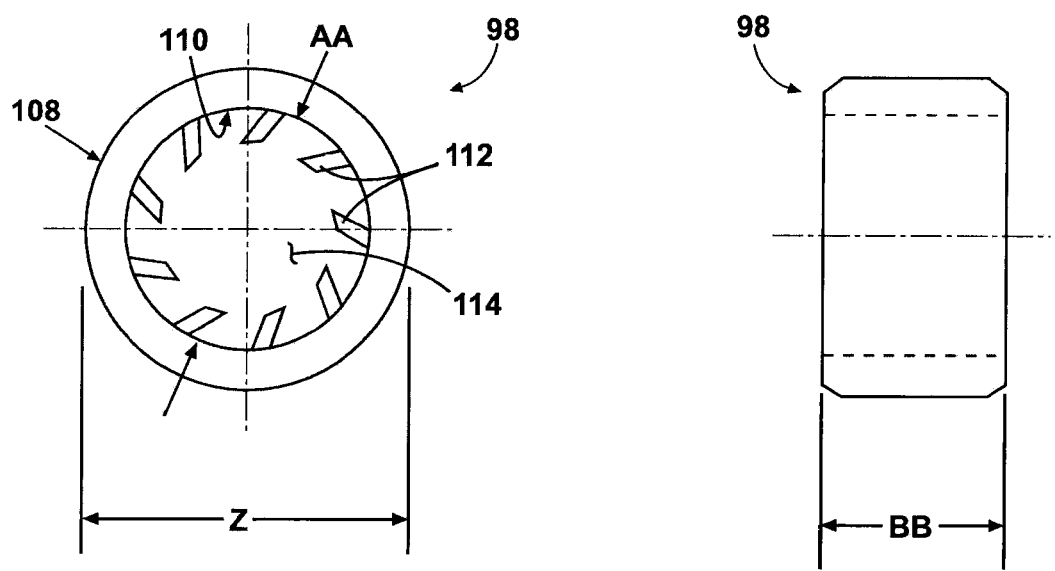
FIG. 18 is a top plan view of a retainer ring of the present disclosure.
FIG. 19 is a side elevational view of the retainer ring of FIG. 18.

Referring to FIGS. 18 and 19, retainer ring 98 has a circular shaped outer body wall 108 having a diameter "Z" and an inner body wall 110 having a diameter "AA" less than diameter "Z". Retainer ring 98 has a total height "BB". A plurality of flexible fingers 112 are homogenously connected to inner body wall 110 and extend inwardly into an aperture 114 defined by inner body wall 110. Flexible fingers 112 can each be oriented transverse to inner body wall 110 or can preferably each extend inwardly at an angle from inner body wall 110 to permit flexible fingers 112 to more easily deflect. Referring back to FIG. 13, the flexible fingers 112 of retainer ring 98 are adapted to elastically deflect outwardly (toward inner body wall 110) from their as-molded orientation shown in FIG. 18 when they contact body wall 96 as sleeve body 90 is inserted into through-aperture 114. This elastic deflection provides a biasing force to retain retainer ring 98 in contact with sleeve body 90. According to several embodiments, diameter "Z" is approximately 0.34 in (8.75 mm), and height "BB" is approximately 0.19 in (5.0 mm). Diameter "BB" can vary at the discretion of the manufacture depending on several features including the quantity and thickness of flexible fingers 112, and a length and orientation of flexible fingers 112.

Figure 20:
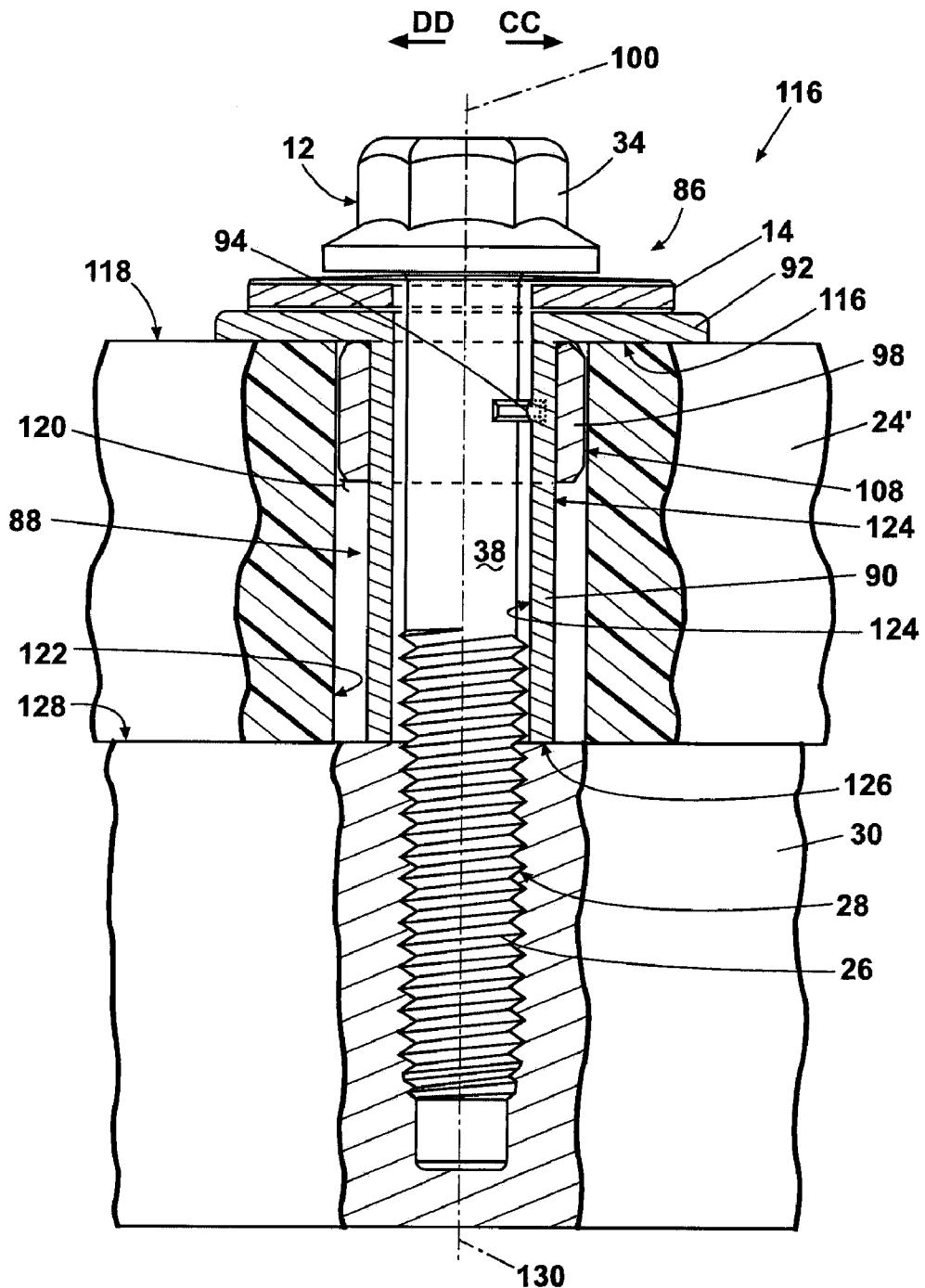
FIG. 20 is a partial cross-sectional front elevational view of a further embodiment of a compression limiter of the present disclosure.

Referring now to FIG. 20, compression limiter assembly 86 is shown in an exemplary installed condition with respect to a modified polymeric body 24' and receiving body 30. A flange face 116 of flange 92 is in contact with an outward directed flat face 118 of polymeric body 24'. Polymeric body 24' has been modified to include an enlarged through-aperture 120 which has an inner wall defining a diameter of through-aperture 120 adapted to frictionally engage outer body wall 108 of retainer ring 98. This frictional engagement retains compression limiter assembly 86 in contact with polymeric body 24' before threaded engagement of fastener 12 with receiving body 30. Prior to threaded engagement of fastener 12, fastener 12 can freely laterally deflect in either of a direction "CC" or a direction "DD" within an inner wall 124 of sleeve body 90 as further limited by contact between the unthreaded shank portion 38 of fastener 12 with any of the swages 94.

When the threaded shank portion 26 of fastener 12 is aligned and threadably engaged with threaded aperture 28 of receiving body 30, torquing fastener 12 compresses flex washer 14 between head 34 of fastener 12 and flange 92. At this time a distal or free end 126 of sleeve body 90 contacts an upper face 128 of receiving body 30 which thereafter transfers the torque load of fastener 12 through sleeve member 88 to receiving body 30 to prevent yielding the material of polymeric body 24'. In the completed assembly, the longitudinal axis 100 of compression limiter assembly 86 is co-axially aligned with a longitudinal axis 130 of threaded aperture 28.

Compression limiters of the present disclosure offer several advantages. The sleeve body 20 which is created of a rigid material such as a metal can bear the load of a fastener without compressing or inducing creep in a plastic part fastened to a metallic component. The sleeve body is formed by creating both external and internal protuberances after a fastener is received within the sleeve body, which thereafter prevents the threaded portion of the fastener from releasing from the assembly. A spring washer is used between the fastener and a flange of the sleeve to provide a spring force tending to overcome any subsequent creep, construction tolerances, or thermally induced fit-up changes between the polymeric body and the receiving body. Use of an annularly formed swage or recess of the present disclosure permits careful control of the resulting internal diameter of the sleeve body. This allows both lateral and axial motion of the fastener during alignment and installation of the fastener while preventing the release of the fastener from the sleeve after installation and before installation. Release is inhibited by interference between a larger diameter threaded portion of the fastener shank and the internal protuberance.

What is claimed is:

1. A compression limiter, comprising:
   a tubular shaped body having a flange radially outwardly extending from a first end of the body and a through aperture created through both the body and the flange; and
   a protuberance created in the tubular shaped body proximate to the flange defining an internal member extending partially into the through aperture of the body, the protuberance operable to prevent axial release of a fastener received in the through aperture by contact between a threaded shank portion of the fastener and the protuberance, an unthreaded shank portion of the fastener being capable of a lateral motion within a diameter defined by the protuberance;
   wherein, the protuberance is a swage created in the body to displace the internal member inwardly;
   wherein the compression limiter further comprises a sleeve member defining the tubular shaped body, the sleeve member having a diameter; and
   a retainer ring slidably received about the diameter of the sleeve member;
   wherein the retainer ring is a polymeric material and further includes a plurality of flexible fingers homogenously connected to an inner wall of the retainer ring, the flexible fingers each inwardly directed from the inner wall into a through aperture of the retainer ring.

2. The compression limiter of claim 1, further comprising an elastically deflectable washer, wherein the washer is received between a head of the fastener and the flange of the body, the fastener being insertable through both the washer and the body.

3. The compression limiter of claim 1, wherein the body is substantially cylindrical and has a tubular shape.

4. The compression limiter of claim 1, wherein the protuberance is a thread created in the body.

5. A compression limiter assembly, comprising:

a tubular shaped body, including an internal protuberance extending partially into a through aperture of the body;

a fastener received in the through aperture of the body, the fastener including a head in contact with the body, an unthreaded shank portion extending immediately from the head, and a threaded shank portion extending from the unthreaded shank portion having a threaded diameter greater than a diameter of the unthreaded shank portion; and a diameter defined by the internal protuberance, the internal protuberance operable to prevent sliding release of the fastener by contact between the threaded shank portion and the internal protuberance, the diameter greater than the threaded diameter of the unthreaded shank portion to permit lateral motion of the fastener unthreaded shank portion within the diameter;

wherein the internal protuberance is formed by a swage created on an external surface of the body after the fastener is inserted into the body to displace the internal protuberance inwardly;

wherein the compression limiter assembly further comprises a flange radially and homogenously extending from a first end of the body; and a spring washer received between the head of the fastener and the flange of the body when the fastener is inserted through both the spring washer and the body;

a sleeve member defining the tubular shaped body, the sleeve member having a diameter; and a retainer ring slidably received about the diameter of sleeve member; and wherein the retainer ring is a polymeric material and further includes a plurality of flexible fingers homogenously connected to an inner wall of the retainer ring, the flexible fingers each inwardly directed from the inner wall into a through aperture of the retainer ring.

6. The compression limiter assembly of claim 5, wherein the fastener is received in the through aperture of the body prior to creation of the internal protuberance.

* * * * *